Dec. 6, 1955  A. KALENIAN  2,726,093
JAW-OPERATING MECHANISM FOR ROTARY CHUCKS
Filed Sept. 23, 1954  2 Sheets-Sheet 1

INVENTOR.
ARAM KALENIAN
BY Charles R. Fay,
atty.

Dec. 6, 1955 — A. KALENIAN — 2,726,093
JAW-OPERATING MECHANISM FOR ROTARY CHUCKS
Filed Sept. 23, 1954 — 2 Sheets-Sheet 2

INVENTOR.
ARAM KALENIAN
BY Charles R. Fay
Atty.

United States Patent Office 2,726,093
Patented Dec. 6, 1955

2,726,093

JAW-OPERATING MECHANISM FOR ROTARY CHUCKS

Aram Kalenian, Westboro, Mass.

Application September 23, 1954, Serial No. 457,951

10 Claims. (Cl. 279—116)

This invention relates to new and improved chuck jaw operating mechanisms, the principal object of which resides in the provision of means for operating the jaws i. e. opening and closing the same, at any rotative position of the chuck, so that the chuck does not have to be indexed to a certain position in order to apply a tool for operating the jaws as is common in the art. With the present invention, the chuck jaws are capable of quick and easy operation at any point of rotation of the chuck, and this clearly will result in a great saving of time in setting up workpieces in the chuck, since regardless of the point at which the chuck happens to stop at the end of the particular operation being performed, the operator is enabled immediately to open the jaws to remove the finished piece and to close the jaws on a new piece placed in the chuck.

Further objects of the invention include the provision of annular means mounted on the periphery of the usual chuck, in combination with a wrench or the like tool which is easily applied to such means at any point on the circumference of the chuck, in combination with means operated by said annular means at predetermined locations on the circumference of the chuck for operating the chuck jaw scroll, in turn operating the chuck jaws; and the provision of chuck jaw operating means as aforesaid wherein said annular means includes a pair of ring gears provided with laterally facing teeth in constant engagement with a pinion for each scroll operating pinion in the chuck, said ring gears being circumferentially slidable on the periphery of the chuck and operable by means of a wrench or tool having teeth for engagement with the ring gear teeth at any point on the circumference of the chuck, said wrench or toothed tool turning said ring gears in opposite directions, depending upon rotation of the tool, and thereby turning the pinion gears for operation of the jaw operating scrolls.

Other objects and advantages of the invention will appear hereinafter.

Reference is to be had to the accompanying drawings, in which

Figure 1:
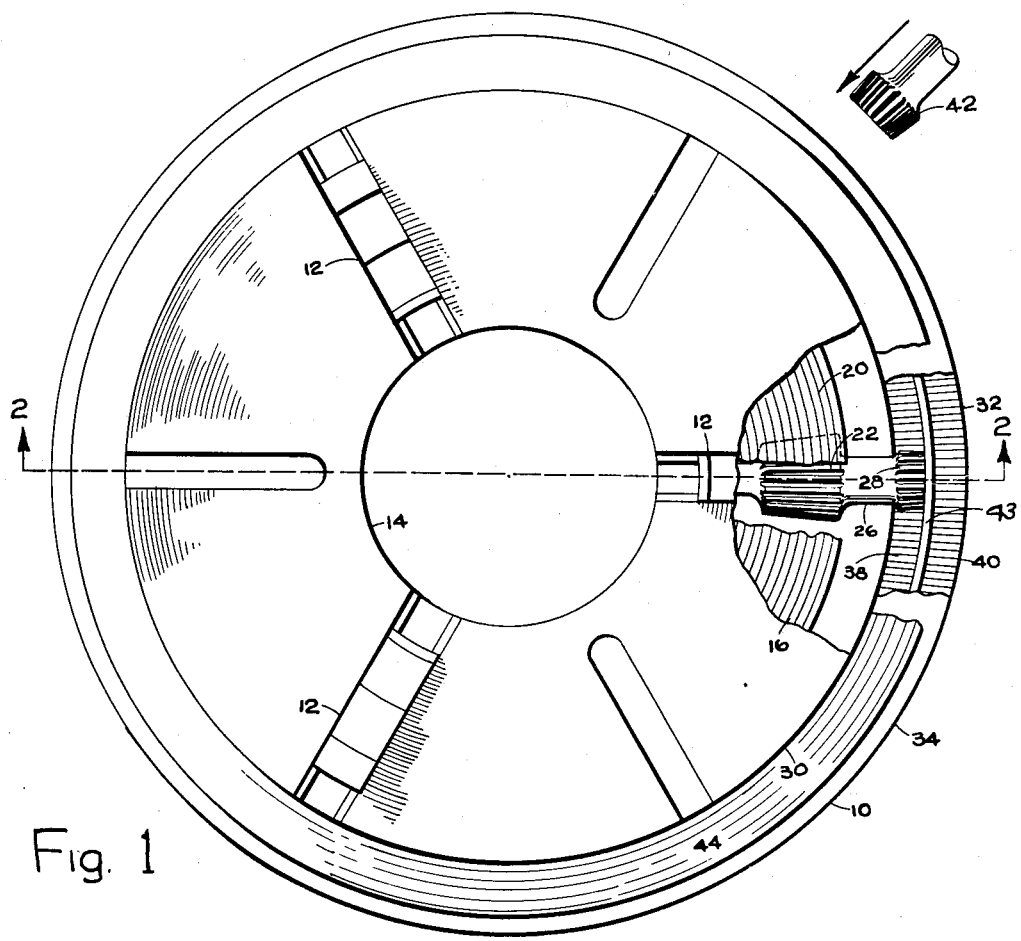
Fig. 1 is a view in elevation of a chuck with parts broken away, and illustrating the application of the present invention thereto.

The present invention has been shown as applied to a manual chuck generally indicated by the reference numeral 10. The essential characteristics of this chuck are that it is rotary; it is provided with a series (usually three) of radially arranged and movable work-holding jaws 12; these jaws being moved radially inwardly to clamp a piece of work exteriorly of the work or outwardly to clamp a piece of work interiorly; and in the center of the chuck the same is open as is shown at 14, as distinct from power-operated chucks which are closed in the center and cannot provide the convenient center opening of the manual chuck.

Figure 4:
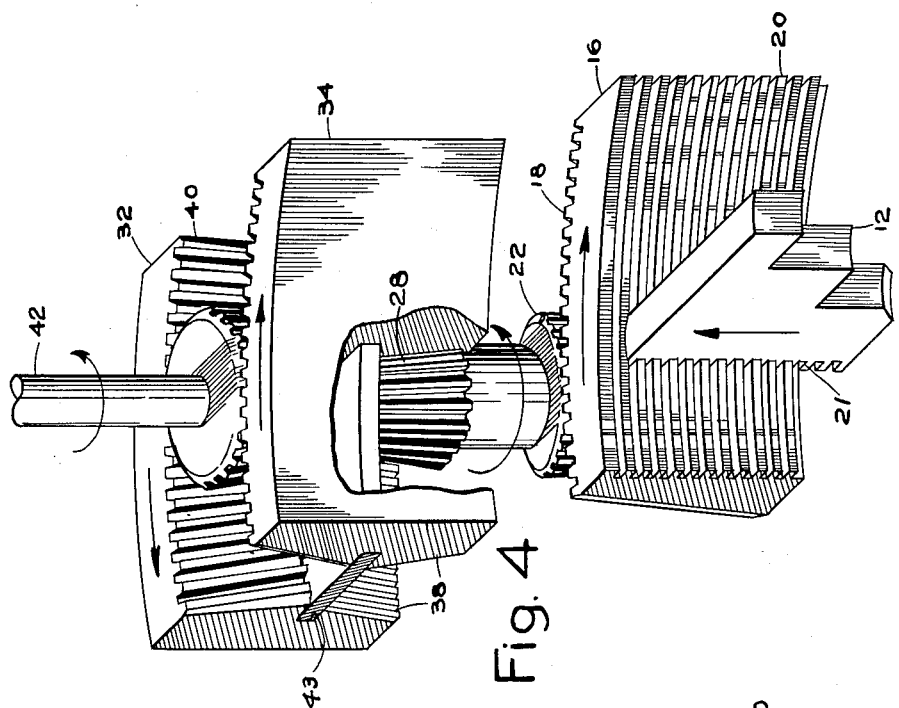
Figs. 3 and 4 are perspective views on an enlarged scale illustrating the operation of the essential parts of the device.
Figure 3:
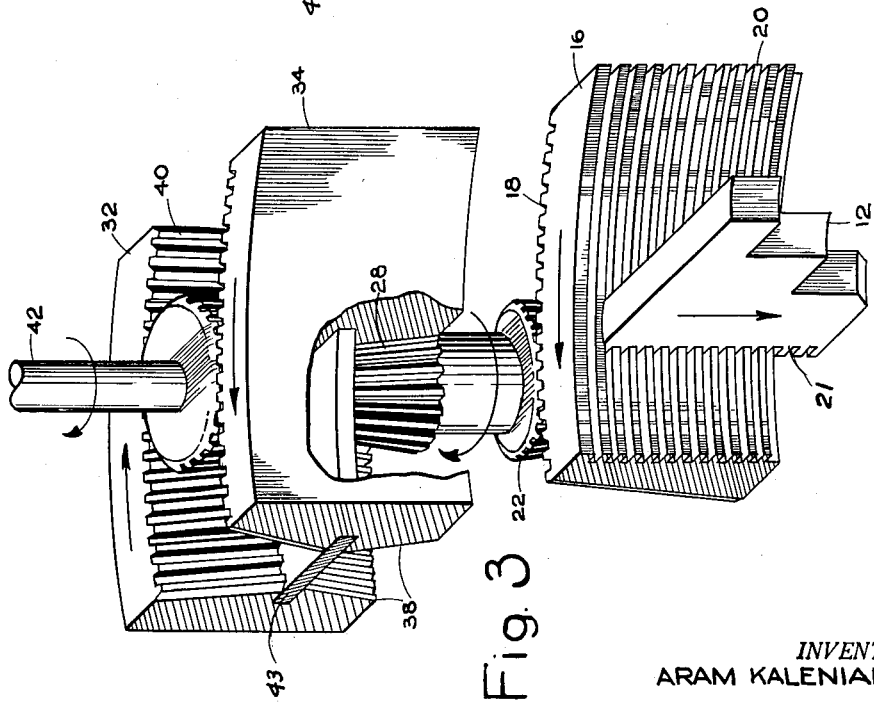

The jaws 12 are moved in and outwardly simultaneously by means of a scroll member generally indicated at 16. This member, as best shown in Figs. 3 and 4, is provided with a series of generally radially arranged teeth 18 at one face thereof and a series of spiral teeth 20 at the other face. The spiral teeth 20 are engaged with corresponding teeth 22 at the interior edges of the jaws 12, and the teeth 18 are in constant mesh with pinions 22, the latter being journalled in any way desired in the interior of the chuck.

In the operation of such a manual chuck, any one of the three pinions 22 is turned by any convenient means such as an Allen head wrench or a key which may be made for the purpose. Upon rotation of a pinion 22, the scroll 16 moves in either a clockwise or counter-clockwise direction with reference to the chuck face, and this motion in turn moves the jaws 12 inwardly or outwardly, depending upon the direction of rotation of the individual pinion 22.

In the conventional chuck therefore, the chuck must come to a stop with a pinion 22 in a convenient position for the operator to insert his key or wrench; or where a power-operated wrench is provided, the same is usually in a fixed location and the chuck must be indexed to match the position of the tool. This indexing operation takes time and delays production of the machine.

The present invention incorporates the aforesaid structure in general, and in addition thereto contemplates the extension of the pins 24 on which the pinions 22 are mounted to extend radially outwardly as at 26, terminating in additional novel pinions 28. It is preferred that there shall be a pinion 28 for each pinion 22, and in any case pinions 28 extend radially outwardly beyond the circumferential edge of the chuck which is indicated at 30.

The pinions 28 are constantly in mesh with a pair of similar but reversed or opposite ring gears which are indicated at 32 and 34. Each of these ring gears is slidably mounted for circumferential movement on the periphery 30 of the chuck, and each ring gear is provided with generally V-shaped teeth which closely approach each other adjacent the central portions thereof at 36, thus providing two separate sets of V-shaped teeth.

The interior of one of these sets of V-shaped teeth is in mesh with the pinions 28 as indicated at 38 and the outer set of V-shaped teeth indicated at 40 are adapted to be engaged by a movable key or toothed wrench indicated at 42. This wrench or key is not in constant engagement with the teeth at 40, but is brought into engagement therewith at the will of the operator, when the chuck has stopped its rotary movement, and it will be clear that tool 42 may be brought in radially from any fixed position about the periphery of the chuck, regardless of the rotative position thereof. If the tool 42 is power-operated, it may be positioned in fixed location and will operate the chuck at any position thereof. On the other hand, if the tool 42 is manually operated, it may be engaged with teeth 40 at the will of the operator at any time and at any place when the chuck has stopped.

Separating the respective teeth 38 and 40, there is provided a dust-excluding and oil-retaining strip or ring 43 which may be set into oppositely facing grooves dividing the teeth 40 from those at 38 and enclosing all of the gearing except for teeth 40.

Figure 2:
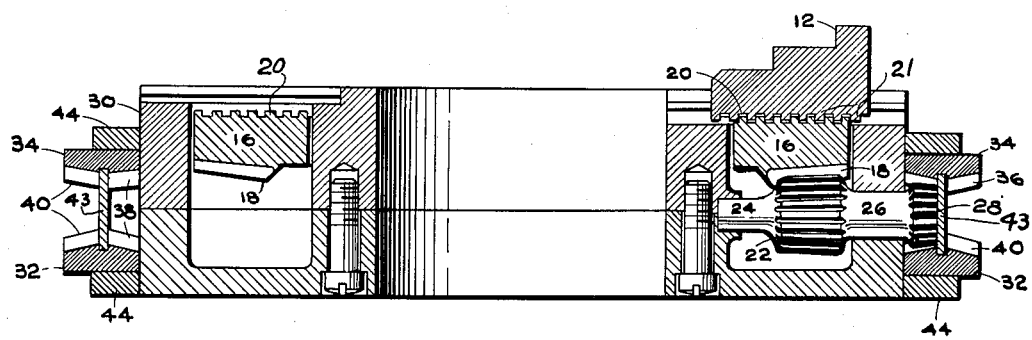
Fig. 2 is a view in section through the chuck on line 2—2 of Fig. 1.

The two ring gears 32 and 34 may be held in position by a series of blocks or retaining rings 44 which are fixed to the chuck at the periphery thereof as clearly shown in Figs. 1 and 2.

In the operation of the device, the same is best disclosed in Figs. 3 and 4 which are substantial duplicates but show the inward or selectively outward motion of jaws 12, depending upon the direction of rotation of the tool or wrench 42. It is believed that these figures clearly show the operation of the device by the respective arrows which indicate the respective directions of motions of the ring gears 32 and 34, which in turn depend upon the respective direction of rotation of the tool 42. With the two ring gears travelling in opposite directions, the pinions 38 will be turned in one direction or the other and the pinions 22 thereby rotated to turn the scroll 16 in either direction according to the arrows in order to cause the jaws to be turned in or outward.

This invention is seen to provide a relatively simple gear for avoiding all indexing of a rotary chuck in order to operate the jaws thereof and regardless of where the chuck may stop in its driven motion. The tool 42 is instantly applicable to any point at the periphery thereof for operating the jaws as above described to release the old workpiece and for clamping the new workpiece in position, thus saving a large proportion of time when the machine is not actually in operation and in turn providing for more economical machine operations, etc.

Having thus described my invention and the advantages thereof, I do not wish to be limited to the details herein disclosed, otherwise than as set forth in the claims, but what I claim is:

1. The combination with a rotary chuck having radially extending and movable jaws and means for radially moving said jaws at spaced points on the periphery of the chuck, with plural means for operating said jaw-moving means in both directions and extending about the entire periphery of the chuck and operable at any point on the periphery thereof for operating said jaw-moving means.

2. The combination with a rotary chuck having radially extending and movable jaws and means for radially moving said jaws at spaced points on the periphery of the chuck, with means for operating said jaw-moving means extending about the entire periphery of the chuck and operable at any point on the periphery thereof for operating said jaw-moving means, said operating means comprising annular members slidable circumferentially on the periphery of the chuck and in constant operative engagement with the means for moving the chuck jaws.

3. The combination with a rotary chuck having radially extending and movable jaws and means for radially moving said jaws at spaced points on the periphery of the chuck, with means for operating said jaw-moving means extending about the entire periphery of the chuck and operable at any point on the periphery thereof for operating said jaw-moving means, said operating means including a pair of ring gears, a pinion in constant mesh therewith, said pinion being connected to the jaw-moving means, said ring gears being peripherally slidable on the circumference of the chuck.

4. A rotary chuck comprising a rotary body, radial jaws mounted thereon, means for moving said jaws radially on said body, said means comprising a scroll, a pinion in mesh with said scroll, annular members disposed on the periphery of the chuck in free sliding relationship therewith, and inter-engaging means between said annular members and said pinion for operating the scroll, said annular members being actuatable from any point on the circumference of the chuck.

5. A rotary chuck comprising a rotary body, radial jaws mounted thereon, means for moving said jaws radially on said body, said means comprising a scroll, a pinion in mesh with said scroll, an annular member disposed on the periphery of the chuck in free sliding relationship therewith, and inter-engaging means between said annular member and said pinion for operating the scroll, said annular member being actuatable from any point on the circumference of the chuck, said annular member comprising a ring gear and a pinion in mesh therewith, said pinion being connected to said first-named pinion for operating the same in conformance therewith.

6. A rotary chuck comprising a rotary body, radial jaws mounted thereon, means for moving said jaws radially on said body, said means comprising a scroll, a pinion in mesh with said scroll, an annular member disposed on the periphery of the chuck in free sliding relationship therewith, and inter-engaging means between said annular member and said pinion for operating the scroll, said annular member being actuatable from any point on the circumference of the chuck, said annular member comprising a pair of ring gears having teeth facing each other and a pinion in constant mesh with both ring gears, said pinion being connected to said first-named pinion to operate the same in conformance therewith.

7. A rotary chuck comprising a rotary body, radial jaws mounted thereon, means for moving said jaws radially on said body, said means comprising a scroll, a pinion in mesh with said scroll, an annular member disposed on the periphery of the chuck in free sliding relationship therewith, and inter-engaging means between said annular member and said pinion for operating the scroll, said annular member being actuatable from any point on the circumference of the chuck, said annular member comprising a pair of ring gears having teeth facing each other and a pinion in constant mesh with both ring gears, said pinion being connected to said first-named pinion to operate the same in conformance therewith, and means for selectively engaging the teeth of the two ring gears for turning the same in opposite directions, said means being applied at any point on the circumference of the chuck.

8. A rotary chuck comprising a chuck body of substantially circumferential form, a series of radially movable jaws on said body, means for moving said jaws radially, said means including a pinion, an extension on said pinion, a second pinion on said extension, said second pinion extending radially outwardly of the periphery of the chuck, a pair of ring gears rotatively slidably mounted on the periphery of the chuck, said ring gears having teeth facing each other and in engagement with said second-named pinion, and means for turning said ring gears in opposite directions, said last-named means being applicable to said ring gears at any point on the circumference of the chuck.

9. The rotary chuck as recited in claim 8 wherein the facing teeth on the two ring gears are disposed at angles to each other.

10. The rotary chuck as recited in claim 8 wherein the facing teeth on the two ring gears are disposed at angles to each other both outwardly and interiorly to present a double V-shape, the means for turning the ring gears being a tapered pinion, and the second pinion being tapered, to fit the V-shape.

References Cited in the file of this patent

UNITED STATES PATENTS

| 1,433,032 | Potter | Oct. 24, 1922 |
| 2,529,772 | Highberg | Nov. 14, 1950 |

FOREIGN PATENTS

| 118,609 | Great Britain | July 20, 1918 |
| 247,951 | Great Britain | Feb. 16, 1926 |
| 361,915 | Germany | Oct. 20, 1922 |